United States Patent
Kim et al.

(10) Patent No.: US 10,937,592 B2
(45) Date of Patent: Mar. 2, 2021

(54) CONDUCTIVE POWDER FOR INTERNAL ELECTRODE AND CAPACITOR COMPONENT INCLUDING THE SAME

(71) Applicant: SAMSUNG ELECTRO-MECHANICS CO., LTD., Suwon-si (KR)

(72) Inventors: Jae Hee Kim, Suwon-si (KR); Seok Kyoon Woo, Suwon-si (KR); Won Hee Yoo, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 104 days.

(21) Appl. No.: 16/191,432

(22) Filed: Nov. 14, 2018

(65) Prior Publication Data
US 2020/0090865 A1   Mar. 19, 2020

(30) Foreign Application Priority Data
Sep. 18, 2018 (KR) .......... 10-2018-0111284

(51) Int. Cl.
| | | |
|---|---|---|
| *H01G 4/008* | (2006.01) |
| *H01G 4/30* | (2006.01) |
| *H01G 4/248* | (2006.01) |
| *H01G 4/232* | (2006.01) |
| *B82Y 30/00* | (2011.01) |
| *H01G 4/12* | (2006.01) |
| *H01B 1/08* | (2006.01) |

(52) U.S. Cl.
CPC ........ *H01G 4/0085* (2013.01); *H01G 4/2325* (2013.01); *H01G 4/248* (2013.01); *H01G 4/30* (2013.01); *B82Y 30/00* (2013.01); *H01B 1/08* (2013.01); *H01G 4/1227* (2013.01)

(58) Field of Classification Search
CPC .... H01G 4/0085; H01G 4/2325; H01G 4/248; H01G 4/30; H01G 4/1227; B82Y 30/00; H01B 1/08
See application file for complete search history.

(56) References Cited

U.S. PATENT DOCUMENTS

| | | | |
|---|---|---|---|
| 10,290,423 B2* | 5/2019 | Kim | .......................... H01G 4/30 |
| 2013/0038980 A1 | 2/2013 | Kim et al. | |
| 2013/0045385 A1* | 2/2013 | Kim | .......................... B22F 1/02 |
| | | | 428/403 |
| 2016/0079001 A1* | 3/2016 | Lin | ..................... C04B 35/4682 |
| | | | 361/305 |
| 2017/0301464 A1* | 10/2017 | Terashita | ................. H01G 2/06 |
| 2018/0144863 A1 | 5/2018 | Kim et al. | |

FOREIGN PATENT DOCUMENTS

| | | |
|---|---|---|
| KR | 10-2013-0017986 A | 2/2013 |
| KR | 10-2016-0102737 A | 8/2016 |
| KR | 10-2018-0057001 A | 5/2018 |

\* cited by examiner

*Primary Examiner* — Dion Ferguson
(74) *Attorney, Agent, or Firm* — Morgan, Lewis & Bockius LLP

(57) ABSTRACT

A conductive powder for an internal electrode includes a metal particle and a graphene oxide disposed on at least a portion of a surface of the metal particle. A content of the graphene oxide is less than 1.0 weight percent, based on a weight of the metal particle.

12 Claims, 5 Drawing Sheets

CONDUCTIVE POWDER FOR INTERNAL ELECTRODE AND CAPACITOR COMPONENT INCLUDING THE SAME

CROSS-REFERENCE TO RELATED APPLICATION(S)

This application claims the benefit of priority to Korean Patent Application No. 10-2018-0111284 filed on Sep. 18, 2018 in the Korean Intellectual Property Office, the disclosure of which is incorporated herein by reference in its entirety.

BACKGROUND

1. Field

The present disclosure relates to a conductive powder for an internal electrode and a capacitor component including the same.

2. Description of Related Art

A multilayer ceramic capacitor, a chip-type condenser, is mounted on the printed circuit boards of various types of electronic products, including display devices such as a liquid crystal display (LCD), a plasma display panel (PDP), and the like, computers, smartphones, mobile phones, and the like, serving to charge or discharge electricity.

Such a multilayer ceramic capacitor may be used as a component of various types of electronic devices, due to advantages thereof such as compactness, high capacitance, and ease of mounting. Due to the trend for small-sized and high-power electronic devices such as computers, mobile devices, and the like, there is an increasing need for small-sized and high-capacitance multilayer ceramic capacitors.

Recently, as industrial interest in electric parts is increasing, multilayer ceramic capacitors have been required to have high-reliability and high-strength characteristics to be used in automobile or infotainment systems.

To manufacture a multilayer ceramic capacitor, a sintering process is performed. During the sintering process, a dielectric powder may be added to a conductive paste for an internal electrode to control a difference between shrinkage behaviors of a dielectric layer and an internal electrode.

However, the addition of the dielectric powder may cause crystal grains disposed at a boundary between a dielectric layer and an internal electrode to be coarse, and the coarse dielectric crystal grains may be intensively provided with an electric field to deteriorate reliability.

SUMMARY

An aspect of the present disclosure is to provide a capacitor component having excellent reliability and a conductive powder for an internal electrode for manufacturing the capacitor component.

According to an aspect of the present disclosure, a conductive powder for an internal electrode includes a metal particle and a graphene oxide disposed on at least a portion of a surface of the metal particle. A content of the graphene oxide is less than 1.0 weight percent, based on a weight of the metal particle.

According to an aspect of the present disclosure, a capacitor component includes a body including a dielectric layer and a plurality of internal electrodes alternately disposed to face each other with the dielectric layer interposed therebetween, the body having first and second surfaces disposed to oppose each other, third and fourth surfaces connected to the first and second surfaces and disposed to oppose each other, and fifth and sixth surfaces connected to the first to fourth surfaces and disposed to oppose each other, and an external electrode including a connection portion disposed on the third or fourth surface of the body and band portions extending from the connection portion to portions of the first and second surfaces. The internal electrodes include a metal crystal grain and a graphene oxide disposed at a boundary of the metal crystal grain.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
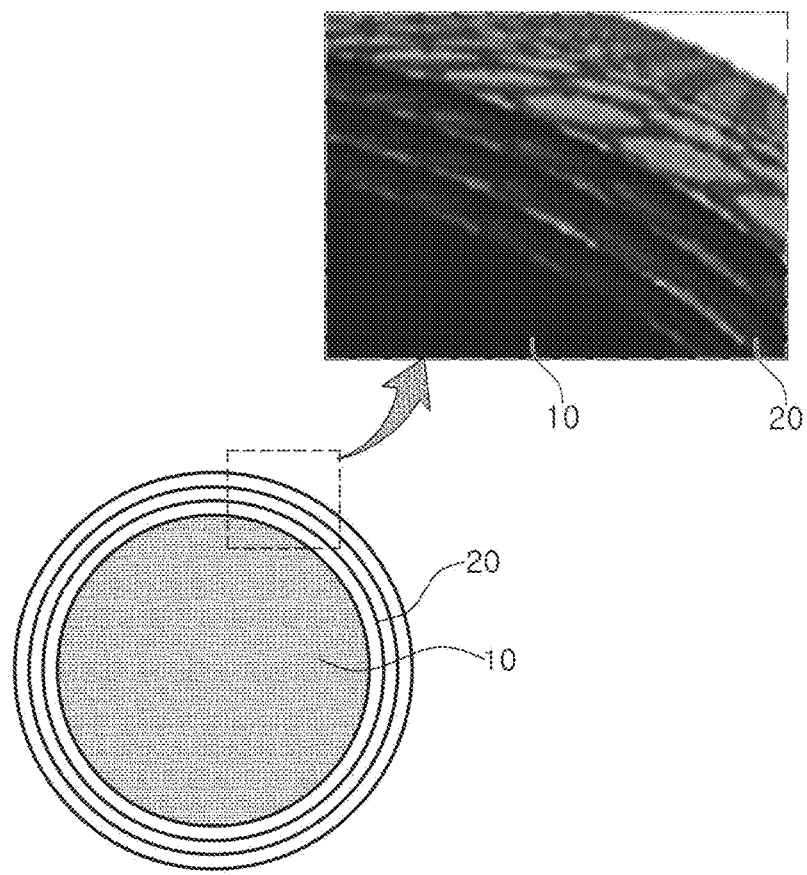
FIG. 1 is a schematic diagram of a conductive powder for an internal electrode according to an exemplary embodiment in the present disclosure.

Hereinafter, embodiments in the present disclosure will be described as follows with reference to the attached drawings. The present disclosure may, however, be embodied in many different forms and should not be construed as being limited to the embodiments set forth herein. Rather, these embodiments are provided so that this disclosure will be thorough and complete, and will fully convey the scope of the present disclosure to those skilled in the art. In the drawings, the shapes and dimensions of elements may be exaggerated for clarity, and the same reference numerals will be used throughout to designate the same or like components.

Also, elements having the same function within a scope of the same concept illustrated in drawings of respective embodiments will be described by using the same reference numerals. Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

In drawings, an X direction may be defined as a second direction, an L direction or a length direction, a Y direction may be defined as a third direction, a W direction or a width direction, and a Z direction may be defined as a first direction or a laminated direction, a T direction or a thickness direction.

Conductive Powder for Internal Electrode

FIG. 1 is a schematic diagram of a conductive powder for an internal electrode according to an exemplary embodiment in the present disclosure.

Figure 2:
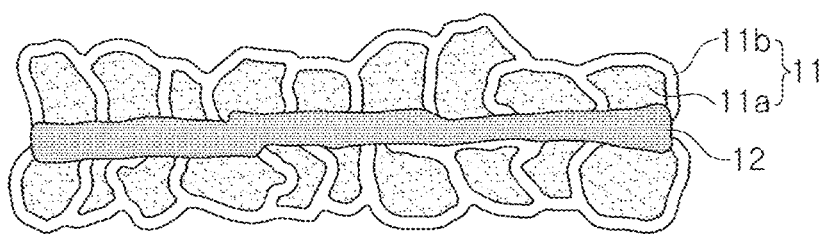
FIG. 2 is a brief schematic diagram of a dielectric layer and an internal electrode when the internal electrode is formed using a conductive powder for an internal electrode according to an exemplary embodiment in the present disclosure.

FIG. 2 is a brief schematic diagram of a dielectric layer and an internal electrode when the internal electrode is formed using a conductive powder for an internal electrode according to an exemplary embodiment in the present disclosure.

Figure 3:
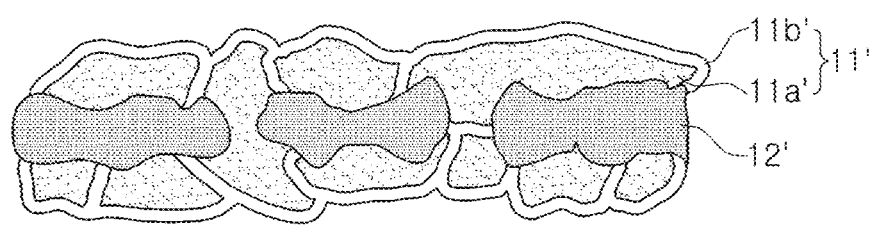
FIG. 3 is a brief schematic diagram of a dielectric layer and an internal electrode when the internal electrode is formed using a related-art conductive paste containing a conductive powder and a dielectric powder.

FIG. 3 is a brief schematic diagram of a dielectric layer and an internal electrode when the internal electrode is formed using a related-art conductive paste containing a conductive powder and a dielectric powder.

Figure 4:
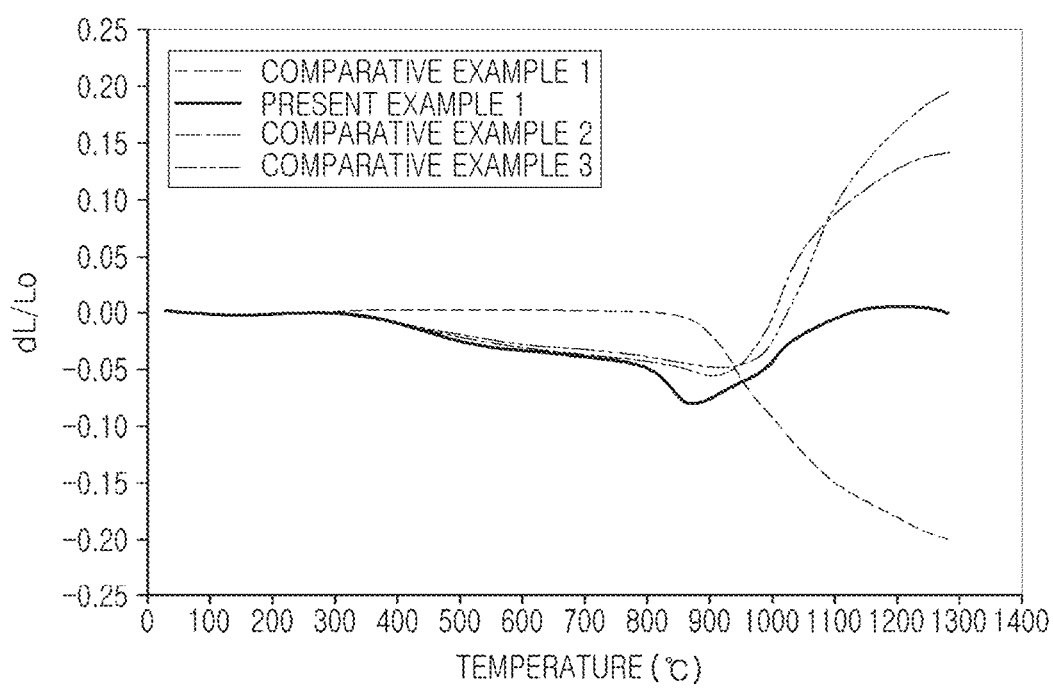
FIG. 4 is a graph comparing sintering shrinkage behaviors depending on the content of a graphene oxide disposed on a surface of metal particles.

FIG. 4 is a graph comparing sintering shrinkage behaviors depending on the content of a graphene oxide disposed on a surface of metal particles.

Hereinafter, a conductive powder for an internal electrode according to an exemplary embodiment will be described more fully with reference to FIGS. 1 to 4.

Referring to FIG. 1, a conductive powder for an internal electrode includes a metal particle 10 and a graphene oxide 20 disposed on at least a portion of a surface of the metal particle 10. The content of the graphene oxide 20 is less than 1.0 weight percent (wt %) based on the weight of the metal particle 10.

The metal particle 10 may be at least one selected from the group consisting of nickel (Ni), copper (Cu), cobalt (Co), iron (Fe), platinum (Pt), gold (Au), aluminum (Al), chromium (Cr), magnesium (Mg), manganese (Mn), molybdenum (Mo), rhodium (Rh), silicon (Si), tantalum (Ta), titanium (Ti), tungsten (W), uranium (U), vanadium (V), and zirconium (Zr), and a material thereof is not limited thereto.

The metal particle 10 may have a spherical shape, but a shape thereof is not limited thereto.

The graphene oxide 20 is disposed on at least a portion of the surface of the metal particle 10. The graphene oxide 20 may be disposed on an entire surface of the metal particle 10.

To manufacture a multilayer ceramic capacitor, a sintering process is performed. Since a sintering initiation temperature of an internal electrode is lower than that of a dielectric layer, interlayer delamination or the like may occur due to a difference in sintering shrinkage behaviors between the internal electrode and the dielectric layer.

In a related art, to control a difference in shrinkage behavior between a dielectric layer and an internal electrode during sintering, a dielectric powder (a ceramic material for delaying shrinkage of a conductive powder for an internal electrode) was added to a conductive paste for an internal electrode to delay sintering initiation time.

However, the dielectric powder included in the conductive paste for an internal electrode moves to an boundary between the internal electrode and the dielectric layer during sintering to make dielectric grains disposed on the boundary therebetween coarse. The coarse dielectric grains are intensively applied with an electric field to degrade reliability.

Since a sintering initiation temperature may be delayed when the graphene oxide 20 is disposed on at least a portion of the surface of the metal particle 10 according to an exemplary embodiment, the content of a dielectric powder may be decreased or the dielectric powder may be replaced.

FIG. 2 is a brief schematic diagram of a dielectric layer and an internal electrode when the internal electrode is formed using a conductive powder for an internal electrode according to an exemplary embodiment in the present disclosure.

FIG. 3 is a brief schematic diagram of a dielectric layer and an internal electrode when the internal electrode is formed using a related-art conductive paste containing a conductive powder and a dielectric powder.

Referring to FIG. 2, in the case of use of a conductive powder for an internal electrode in which a graphene oxide 20 is disposed on at least a portion of a surface of a metal particle 10 according to an exemplary embodiment, a dielectric powder may not be added or the addition amount of the dielectric power may be decreased. Thus, a dielectric crystal grain 11a may be prevented from becoming coarse during sintering.

Accordingly, examination of the dielectric crystal grain 11a and a dielectric crystal grain boundary 11b of a dielectric layer 11 adjacent to an internal electrode 12 shows that the dielectric crystal grain 11a has a small and uniform size.

In addition, smoothness of the internal electrode 12 is improved by graphene bridge characteristics of the graphene oxide 20, and electrical conductivity is improved. Moreover, a thickness of the internal electrode may be secured to be smaller.

Meanwhile, referring to FIG. 3, in the case in which an internal electrode is formed using a related-art conductive paste containing a conductive powder and a dielectric powder, the dielectric powder moves to a boundary between an internal electrode 12' and a dielectric layer 11' during sintering to make a dielectric crystal grain 11a' disposed on the boundary therebetween coarse. The coarse dielectric crystal grain 11a' is subject to electric field intensification, which may be a major factor degrading reliability.

Compared with the internal electrode 12 in FIG. 2, the internal electrode 12' in FIG. 3 encounters electrode short due to electrode agglomeration. In addition, the internal electrode 12' in FIG. 3 has a thickness greater than a thickness of the internal electrode 12 in FIG. 2.

FIG. 4 is a graph comparing sintering shrinkage behaviors depending on the content of a graphene oxide disposed on a surface of metal particles.

A nickel (Ni) powder was used as a metal particle. Comparative Example 1 was an example in which a graphene oxide was not coated (the content of the graphene oxide was 0 wt %). Present Example 1 was an example in which the content of an graphene oxide was 0.5 wt % based on the content of a nickel (Ni) powder. Comparative Example 2 was an example in which the content of a graphene oxide was 1.0 wt % based on the content of a nickel (Ni) powder. Comparative Example 3 was an example in which the content of a graphene oxide was 1.5 wt % based on the content of a nickel (Ni) powder.

In the case of Comparative Example 1, it could be seen that a shrinkage initiation temperature at which shrinkage was performed by 10% or more was earliest.

In the cases of Comparative Examples 2 and 3 in which the contents of a graphene oxide were 1.0 wt % or more based on the content of a nickel (Ni) powder, a rate of expansion was rapidly increased at a high temperature to have a shrinkage behavior different from a shrinkage behavior of a dielectric layer. Therefore, interlayer delamination or the like may occur.

Meanwhile, Present Example 1 in which the content of a graphene oxide is 0.5 wt % based on the content of a nickel (Ni) powder, it could be seen that a rate of shrinkage and a rate of expansion were stable, in detail, less than 10% even at a high temperature.

Accordingly, the content of a graphene oxide may be less than 1.0 wt % based on the content of a metal particle, in detail, less than or equal to 0.9 wt %.

It is not necessary to limit a lower limit of the content of a graphene oxide based on the content of a metal particle. However, in the case in which the content of a graphene oxide is less than 0.1 wt % based on the content of a metal particle, an effect to delay a sintering initiation temperature may not be sufficient. Therefore, the content of a graphene oxide may be greater than or equal to 0.1 wt % based on the content of a metal particle.

A conductive powder for an internal electrode according to an exemplary embodiment may have a core-shell structure in which a core includes the metal particle 10 and a shell includes a graphene oxide 20.

In the graphene oxide, a ratio of carbon atoms to oxygen atoms (C/O) may be 1 to 1.2.

The graphene oxide 20 may have a multilayer structure including at least two layers. The multilayer structure may allow electrical conductivity to be further improved.

Capacitor Component

Figure 5:
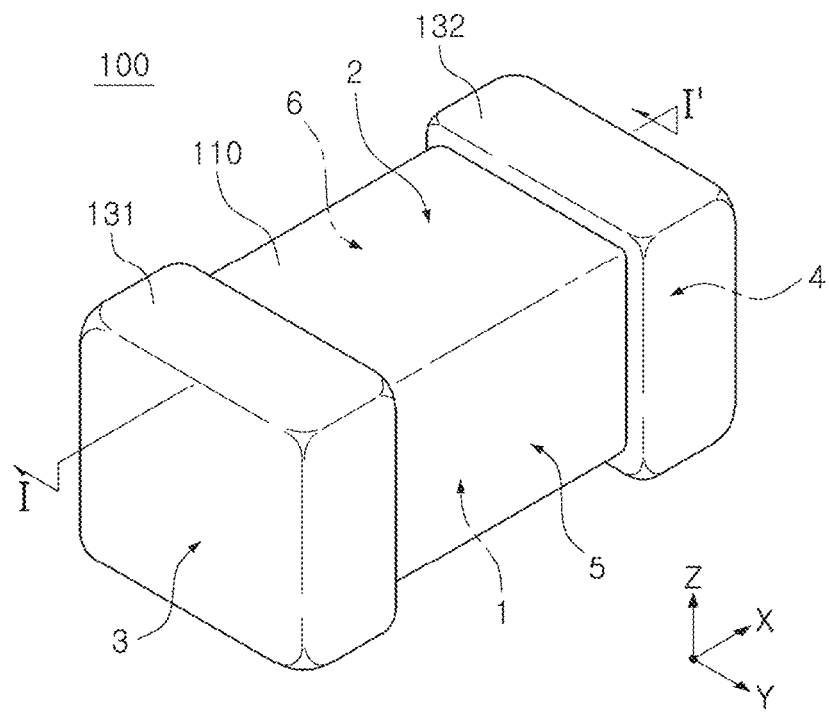
FIG. 5 is a brief perspective view of a capacitor component according to another exemplary embodiment in the present disclosure.

FIG. 5 is a brief perspective view of a capacitor component according to another exemplary embodiment in the present disclosure.

Figure 6:
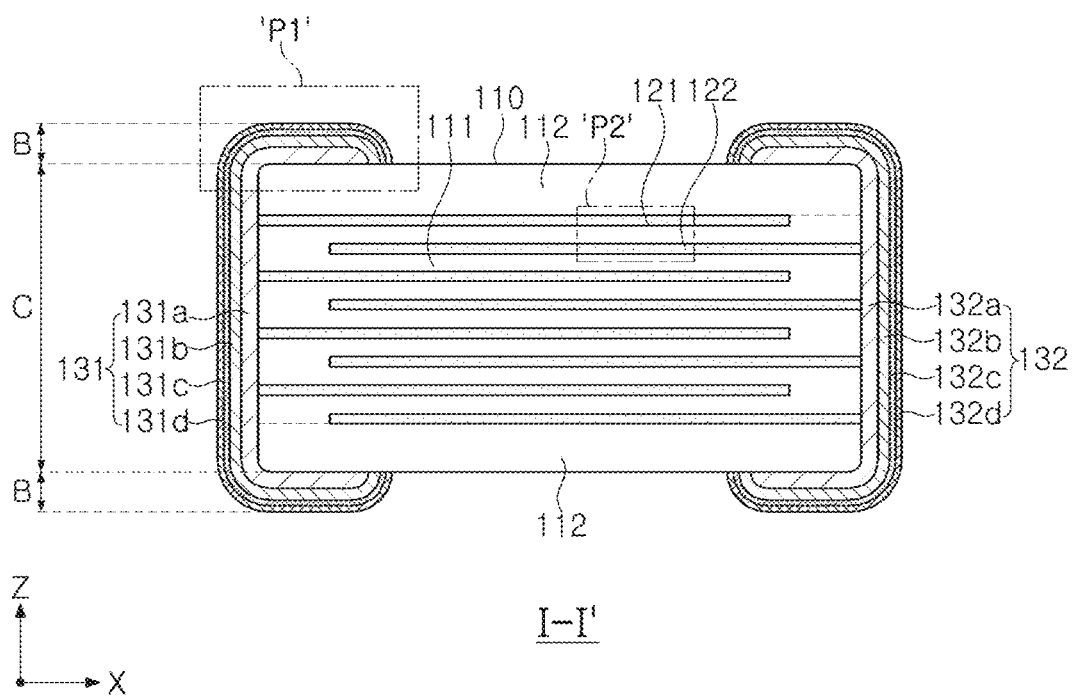
FIG. 6 is a brief cross-sectional view taken along line I-I' in FIG. 5.

FIG. 6 is a brief cross-sectional view taken along line I-I' in FIG. 5.

Figure 7A:
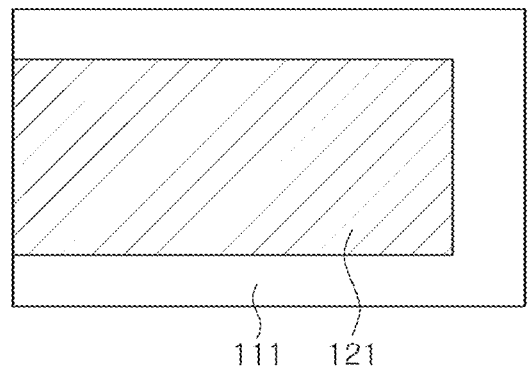
FIG. 7A illustrates a ceramic green sheet on which a first internal electrode is printed.
Figure 7B:
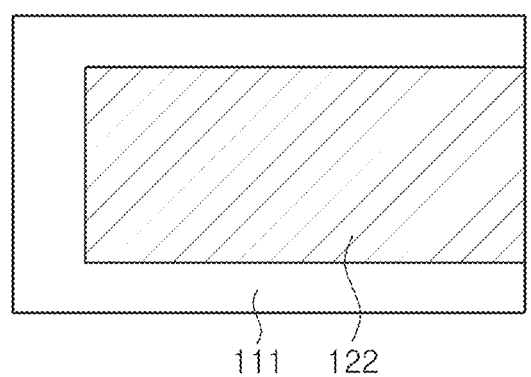
FIG. 7B illustrates a ceramic green sheet on which a second internal electrode is printed.

FIG. 7A illustrates a ceramic green sheet on which a first internal electrode is printed, and FIG. 7B illustrates a ceramic green sheet on which a second internal electrode is printed.

Figure 8:
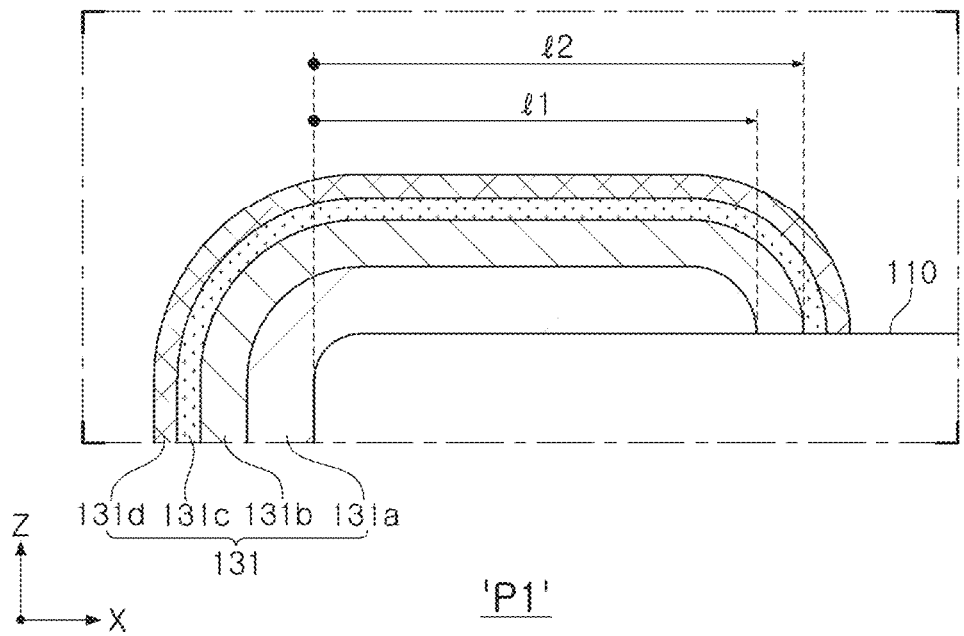
FIG. 8 is an enlarged view of region 'P1' in FIG. 6.

FIG. 8 is an enlarged view of region 'P1' in FIG. 6.

Figure 9:
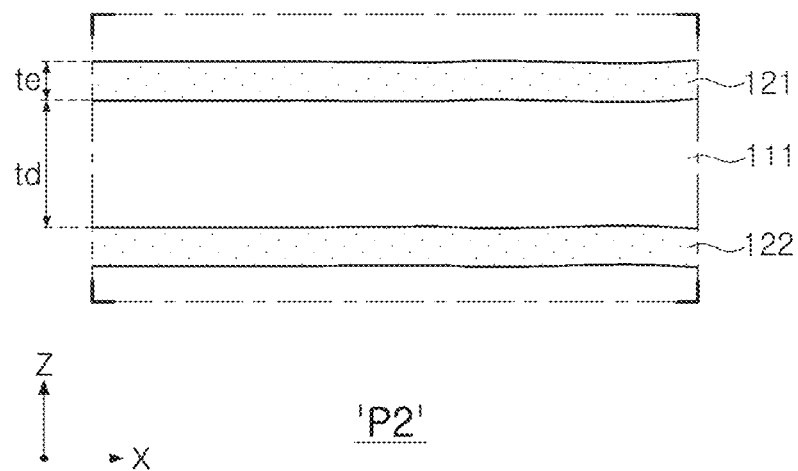
FIG. 9 is an enlarged view of region 'P2' in FIG. 6.

FIG. 9 is an enlarged view of region 'P2' in FIG. 6.

Hereinafter, a capacitor component according to another exemplary embodiment will be described in detail with reference to FIGS. 5 to 9.

A capacitor component 100 according to an exemplary embodiment includes a body 110 and external electrodes 131 and 132. The body 110 includes a plurality of dielectric layers 111 and first and second internal electrodes 121 and 122 alternately disposed to face each other with the dielectric layers 111 interposed therebetween, and has first and second surfaces 1 and 2 disposed to oppose each other in the Z direction, third and fourth surfaces 3 and 4 connected to the first and second surfaces 1 and 2 and disposed to oppose each other in the X direction, and fifth and sixth surfaces 5 and 6 connected to the first to fourth surfaces 1 to 4 and disposed to oppose each other. The external electrodes 131 and 132 include connection portions C disposed on the third surface 3 and the fourth surface 4 of the body 110 and band portions B extending from the connection portions C to portions of the first and second surfaces 1 and 2. The internal electrodes 121 and 122 include a metal crystal grain and a graphene oxide disposed at a boundary of the metal crystal grain.

In the body 110, the dielectric layers 111 and the internal electrodes 121 and 122 are alternately laminated.

The body 110 is not limited in shape, but may have a hexahedral shape or a shape similar thereto. During shrinkage of a ceramic powder included in the body 110 during sintering, the body 110 may have a substantially hexahedral shape rather than a hexahedral shape having entirely straight lines.

The body 110 may have first and second surfaces 1 and 2 disposed to oppose each other in a thickness direction (Z direction), third and fourth surfaces 3 and 4 connected to the first and second surfaces 1 and 2 and disposed to oppose each other in a length direction (X direction), and fifth and sixth surfaces connected to the first and second surfaces 1 and 2 as well as the third and fourth surfaces 3 and 4 and disposed to oppose each other in a width direction (Y direction).

The plurality of dielectric layers 111 constituting the body 110 is sintered, and may be integrated with each other such that boundaries therebetween may not be readily apparent without using a scanning electron microscope (SEM).

According to an exemplary embodiment, a material of the dielectric layers 111 is not limited as long as sufficient capacitance can be obtained therewith. For example, the material of the dielectric layers 111 may a barium titanate-based material, a lead composite perovskite-based material, a strontium titanate-based material or the like.

According to purposes of the present disclosure, a ceramic additive, an organic solvent, a plasticizer, a binder, a dispersant, and the like may be added to a powder such as barium titanate ($BaTiO_3$) which is a material of the dielectric material 111.

The plurality of internal electrodes 121 and 122 may be disposed to face each other with the dielectric layer 111 interposed therebetween.

Since the internal electrodes 121 and 122 include a metal crystal grain and a graphene oxide disposed at a boundary of the metal crystal grain, high electrical conductivity may be secured. As described above, the graphene oxide may serve to improve smoothness of the internal electrodes 121 and 122 by graphene bridge characteristics during sintering and may serve to further decrease thicknesses of the internal electrodes 121 and 122.

The internal electrodes 121 and 22 may include first and second internal electrodes 121 and 122 alternately disposed to face each other with a dielectric layer interposed therebetween.

The first and second may be exposed to the third and fourth surfaces of the body 110, respectively.

Referring to FIGS. 5 and 6, the first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body 110 to be connected to the first internal electrode 121, and the second external electrode 132 may be disposed on the fourth surface 4 of the body 110 to be connected to the second internal electrode 122.

The first and second internal electrodes 121 and 122 may be electrically separated from each other by the dielectric layer 111 interposed therebetween. Referring to FIGS. 7A and 7B, the body 110 may be formed by alternately laminating a ceramic green sheet 'a' on which the first internal electrode 121 is printed and a ceramic green sheet 'b' on which the second internal electrode 122 is printed, in a thickness direction (Z direction) and sintering the laminated ceramic green sheets 'a' and 'b'.

The first and second internal electrodes 121 and 122 may include a metal particle and a graphene oxide disposed on a portion of a surface of the metal particle, and may be formed using a conductive paste including a conductive powder for an internal electrode in which the content of the graphene oxide is less than 1.0 wt % based on the weight of the metal particle.

A printing method of the conductive paste may be a screen printing method, a gravure printing method or the like, but is not limited thereto.

The capacitor component 100 according to another exemplary embodiment may include a capacitance forming portion and cover portions 112. The capacitance forming portion is disposed inside the body 110, and includes a first internal electrode 121 and a second internal electrode 122 disposed to face each other with the dielectric layer 111 interposed therebetween in such a manner that capacitance is formed. The cover portions 112 are disposed above and below the capacitance forming portion.

The cover portions 112 do not include internal electrodes 121 and 122, and may include the same material as the dielectric layer 111. For example, the cover portions 112 may include a ceramic material such as a barium titanate-based material, a lead composite perovskite-based material, a strontium titanate-based material, or the like.

The cover portions 112 may be formed by vertically laminating a single dielectric layer or two or more dielectric layers on top and bottom surfaces of the capacitance forming portion, respectively. The cover portions 112 may basically serve to prevent an internal electrode from being damaged by a physical or chemical stress.

The capacitor component 100 according to another exemplary embodiment includes external electrodes 131 and 132 including a connection portion C disposed on a third surface or a fourth surface 4 of a body 110 and band portions B extending from the connection portion C to portions of the first and second surfaces 1 and 2.

The band portions B may extend from the connection portion C to portions of the first and second surfaces 1 and 2 as well as portions of fifth and sixth surfaces 5 and 6.

The external electrodes 131 and 132 may include a first external electrode 131 including a connection portion disposed on the third surface 3 and a second external electrode 132 including a connection portion disposed on the fourth surface 4.

The first and second external electrodes 131 and 132 may be electrically connected to the first and second internal electrodes 121 and 122 to form capacitance, respectively. The second external electrode 132 may be connected to a potential different from a potential connected to the first external electrode 131.

The external electrodes 131 and 132 may include electrode layers 131a and 132a and conductive resin layers 131b and 132b disposed on the electrode layers 131a and 132a.

The external electrodes 131 and 132 may include nickel (Ni) plating layers 131c and 132c disposed on the conductive resin layers 131b and 132 and tin (Sn) plating layers 131d and 132d disposed on the Ni plating layers 131c and 132d.

In the case in which the external electrodes 131 and 132 include a first external electrode 131 and a second external electrode 132, the first external electrode 131 may include a first electrode layer 131a, a first conductive resin layer 131b, a first Ni plating layer 131c, and a first Sn plating layer, and the second external electrode 132 may include a second electrode layer 132a, a second conductive resin layer 132b, a first Ni plating layer 132c, and a first Sn plating layer 132d.

Hereinafter, the first external electrode 131 will mainly be described, but the description will be similarly applied to the second electrode 132.

A length from an end surface of the body 110 to an end of the band portion B of the electrode layers 131a and 132a may be shorter than a length from the end surface of the body 110 to the band portions B of the conductive resin layers 131b and 132b.

Referring to FIG. 8, l1 denotes a length from a third surface 3 of a body 110 to an end of a band portion B of a first electrode layer 131a, and l2 denotes a length from the third surface 3 of the body 110 to an end of a band portion B of a first conductive resin layer 131b. The distance l1 may be shorter than the distance l2.

Accordingly, the conductive resin layers 131b and 132b may be disposed to fully cover and extend beyond the electrode layers 131a and 132a to be in direct contact with the body 110.

The electrode layers 131a and 132a may include a conductive metal and a glass.

The conductive metal for use in the electrode layers 131a and 132a is not limited as long as it may be electrically connected to the internal electrode to form capacitance. For example, the conductive metal may be at least one selected from the group consisting of copper (Cu), silver (Ag), nickel (Ni), and alloys thereof.

The electrode layers 131a and 132a may be formed by coating a conductive paste prepared by adding a glass frit to the conductive metal powder and sintering the conductive paste.

The conductive resin layers 131b and 132b may be disposed on the electrode layers 131a and 132a to fully cover and extend beyond the electrode layers 131a and 132a to be in direct contact with the body 110.

The conductive resin layers 131b and 132b may include a conductive metal and a base resin.

The base resin included in the conductive resin layers 131b and 132b is not limited as long as it may have bonding and shock absorption and may be mixed with a conductive metal powder to prepare a paste. For example, the base resin may include an epoxy-based resin.

The conductive metal included in the conductive resin layers 131b and 132b is not limited as long as it may be electrically connected to the electrode layers 131a and 132a. For example, the conductive metal may include at least one selected from the group consisting of copper (Cu), silver (Ag), nickel (Ni), and alloys thereof.

The Ni plating layers 131c and 132c may be disposed on the conductive resin layers 131b and 132b to fully cover and extend beyond the conductive resin layers 131b and 132b to be in direct contact with the body 110.

The Sn plating layers 131d and 132d may be disposed on the Ni plating layers 131c and 132c to fully cover and extend beyond the Ni plating layers 131c and 132c.

The Sn plating layers 131d and 132d may serve to improve mounting characteristics.

FIG. 9 is an enlarged view of region 'P2' in FIG. 6.

Referring to FIG. 9, in a capacitor component according to another exemplary embodiment, a thickness td of the dielectric layer 111 and a thickness to of each of the internal electrodes 121 and 122 may satisfy td>2*te.

For example, according to another exemplary embodiment, the thickness td of the dielectric layer 111 is twice greater than the thickness te of each of the internal electrodes 121 and 122.

Generally, an important issue of electronic components for high-voltage electric parts is reliability problem caused by breakdown voltage drop under a high-voltage environment.

In the capacitor component according to another exemplary embodiment, the dielectric layer 111 is provided to have the thickness td twice larger than the thickness te of each of the internal electrodes 121 and 122 to prevent a breakdown voltage from dropping under a high-voltage environment. Thus, a thickness of a dielectric layer that is a distance between internal electrodes may be increased to improve breakdown voltage characteristics.

In the case in which the thickness td of the dielectric layer 111 is at most twice greater than the thickness te of each of the internal electrodes 121 and 122, a thickness of a dielectric layer that is a distance between internal electrodes may be so small that a breakdown voltage drops.

The thickness te of each of the internal electrodes 121 and 122 may be less than 1 micrometer (μm) and the thickness td of the dielectric layer may be less than 2.8 μm, but the thicknesses thereof are not limited thereto.

As described above, when an internal electrode is formed using a conductive powder for an internal electrode in which an graphene oxide is disposed on at least a portion of a surface of a metal particle according to an exemplary embodiment, a dielectric crystal grain of a dielectric layer adjacent to an internal electrode may be formed to have a uniform and small size and a thickness of the internal electrode may be further decreased. Thus, an effect of the present disclosure may be further improved when the thickness te of the internal electrode and the thickness td of the dielectric layer are decreased.

According to an exemplary embodiment, the content of a graphene oxide disposed on a surface of a metal particle of a conductive powder for an internal electrode may be controlled to prevent a coarse dielectric crystal grain from being formed on a boundary between a dielectric layer and an internal electrode and to improve reliability of a capacitor component.

While exemplary embodiments have been shown and described above, it will be apparent to those skilled in the art that modifications and variations could be made without departing from the scope of the present invention as defined by the appended claims.

What is claimed is:

1. A capacitor component comprising:
    a body including a dielectric layer and a plurality of internal electrodes alternately disposed to face each other with the dielectric layer interposed therebetween, the body having first and second surfaces disposed to oppose each other, third and fourth surfaces connected to the first and second surfaces and disposed to oppose each other, and fifth and sixth surfaces connected to the first to fourth surfaces and disposed to oppose each other; and
    an external electrode including a connection portion disposed on at least one selected from the group of the third and fourth surfaces and band portions extending from the connection portion to portions of the first and second surfaces,
    wherein the internal electrodes include metal crystal grains and a graphene oxide disposed at a boundary between the metal crystal grains.

2. The capacitor component of claim 1, wherein the internal electrodes are formed from a conductive powder for an internal electrode, the conductive powder including a metal particle and a graphene oxide disposed on at least a portion of a surface of the metal particle, in which a content of the graphene oxide is less than 1.0 weight percent, based on a weight of the metal particle.

3. The capacitor component of claim 1, wherein each of the internal electrodes has a thickness less than 1 micrometer.

4. The capacitor component of claim 1, wherein the dielectric layer has a thickness less than 2.8 micrometers.

5. The capacitor component of claim 1, wherein $td>2*te$, where to is a thickness of each of the internal electrodes and td is a thickness of the dielectric layer.

6. The capacitor component of claim 1, wherein the external electrode includes an electrode layer electrically connected to the internal electrode and a conductive resin layer disposed on the electrode layer.

7. The capacitor component of claim 6, wherein a length from an end surface of the body to an end of a band portion of the electrode layer is shorter than a length from the end surface of the body to an end of a band portion of the conductive resin layer.

8. The capacitor component of claim 6, wherein the conductive resin layer covers an entire surface of the electrode layer, and extends beyond the electrode layer to be in direct contact with the body.

9. The capacitor component of claim 6, wherein the electrode layer includes a glass and at least one conductive metal selected from the group consisting of copper (Cu), silver (Ag), nickel (Ni), and alloys thereof.

10. The capacitor component of claim 6, wherein the conductive resin layer includes a base resin and at least one conductive metal selected from the group consisting of copper (Cu), silver (Ag), nickel (Ni), and alloys thereof.

11. The capacitor component of claim 8, further comprising a nickel (Ni) plating layer disposed on the conductive resin layer, and a tin (Sn) plating layer disposed on the Ni plating layer.

12. The capacitor component of claim 11, wherein the Ni plating layer covers an entire surface of the conductive resin layer, and extends beyond the conductive resin layer to be in direct contact with the body, and the Sn plating layer covers an entire surface of the Ni plating layer, and extends beyond the Ni plating layer to be in direct contact with the body.

* * * * *